United States Patent [19]

Hammer et al.

[11] Patent Number: 5,617,011

[45] Date of Patent: Apr. 1, 1997

[54] METHOD AND SYSTEM FOR LIMITING GENERATOR FIELD VOLTAGE IN THE EVENT OF REGULATOR FAILURE IN AN AUTOMOTIVE VEHICLE

[75] Inventors: Kathleen M. Hammer, West Bloomfield; David P. Kaminski, Warren, both of Mich.

[73] Assignee: Ford Motor Company, Dearborn, Mich.

[21] Appl. No.: 466,172

[22] Filed: Jun. 6, 1995

[51] Int. Cl.$^6$ ................................................ H02J 7/14
[52] U.S. Cl. ................................ 322/28; 322/36; 322/99
[58] Field of Search ............................... 322/25, 26, 27, 322/28; 320/64

[56] References Cited

U.S. PATENT DOCUMENTS

| | | | |
|---|---|---|---|
| 4,379,990 | 4/1983 | Sievers et al. | 322/99 |
| 4,542,462 | 9/1985 | Morishita et al. | 364/424 |
| 4,543,521 | 9/1985 | Morishita et al. | 320/64 |
| 4,543,522 | 9/1985 | Moreau | 323/303 |
| 4,623,833 | 11/1986 | Edwards | 322/28 |
| 4,651,081 | 3/1987 | Nishimura et al. | 320/64 |
| 4,670,705 | 6/1987 | Sievers et al. | 322/28 |
| 4,733,159 | 3/1988 | Edwards et al. | 323/282 |
| 5,216,350 | 6/1993 | Judge et al. | 322/25 |
| 5,280,232 | 1/1994 | Kohl et al. | 322/23 |

*Primary Examiner*—Steven L. Stephan
*Assistant Examiner*—Nicholas Ponomarenko
*Attorney, Agent, or Firm*—Mark L. Mollon; Roger L. May

[57] ABSTRACT

A method and system are disclosed for limiting the voltage provided by a generator in the event of a regulator or field coil short circuit failure in an automotive vehicle. The voltage provided by the generator is sensed and a corresponding voltage level is generated. The voltage level is then compared to a predetermined voltage threshold. If the voltage level exceeds the predetermined voltage threshold, the high-side field coil switch is cycled by the controller so as to control the voltage provided by the generator. The electronic components of the vehicle are protected from overvoltage damage, and the battery is prohibited from overcharging.

7 Claims, 2 Drawing Sheets

METHOD AND SYSTEM FOR LIMITING GENERATOR FIELD VOLTAGE IN THE EVENT OF REGULATOR FAILURE IN AN AUTOMOTIVE VEHICLE

TECHNICAL FIELD

This invention relates to methods and systems for limiting the field voltage of a generator in the event of an voltage regulator failure or field coil short circuit failure in an automotive vehicle.

BACKGROUND ART

Conventional automotive power supply systems include a voltage regulator, an engine-driven generator and a battery. The generator has field windings and provides an output current which is a function of the voltage across the field windings. The voltage regulator serves to maintain the output voltage of the generator in accordance with the voltage requirements of the battery by controlling the current flow through the field windings of the generator.

One problem associated with conventional power supply systems results from voltage regulator or field coil short circuit failures. When the voltage regulator fails short, a maximum field current is applied to the generator which causes maximum charging voltage to be applied to the battery regardless of its state of charge. The battery voltage then increases to approximately 19 VDC which leads to an over-charge condition. Vehicle warning lamps are also operated at excessive voltage and, if this condition is allowed to continue, may either burn out the lamps or severely limit the life of the lamps. The known prior art includes designing all electronic modules in the vehicle to operate at 19 VDC to ensure vehicle operation under an excessive voltage condition.

U.S. Pat. No. 4,543,521, issued to Morishita et al., discloses a device for detecting faults in a vehicle's charging system and displaying the detection result on a display. However, Morishita fails to disclose a method or system for controlling the generator once the fault is detected.

DISCLOSURE OF THE INVENTION

It is thus a general object of the present invention to provide a method and system for limiting the field voltage of a generator in the event of a regulator failure in an automotive vehicle.

In carrying out the above objects and other objects, features and advantages, of the present invention, a method is provided for limiting the voltage provided by the generator in the event of a failure of the regulator or a field coil short circuit. The method includes the step of sensing the voltage provided by the generator and generating a corresponding voltage signal. The method also includes the step of determining whether the voltage signal exceeds a predetermined voltage threshold. The method further includes the step of controlling the voltage provided by the generator if the voltage signal exceeds the predetermined voltage threshold in order to protect the electronic components of the vehicle from over-voltage damage.

In further carrying out the above objects and other objects, features and advantages, of the present invention, a system is also provided for carrying out the steps of the above described method. The system includes a sensing circuit for sensing the voltage provided by the generator and generating a corresponding voltage signal. The system also includes means for determining whether the voltage level exceeds the predetermined voltage threshold. The system further includes means for controlling the voltage provided by the generator so as to protect the electronic components of the vehicle from over-voltage damage.

The above objects, features and advantages of the present invention, as well as others, are readily apparent from the following detailed description of the best mode for carrying out the invention when taken in connection with the accompanying drawings.

BEST MODE FOR CARRYING OUT THE INVENTION

Figure 1:
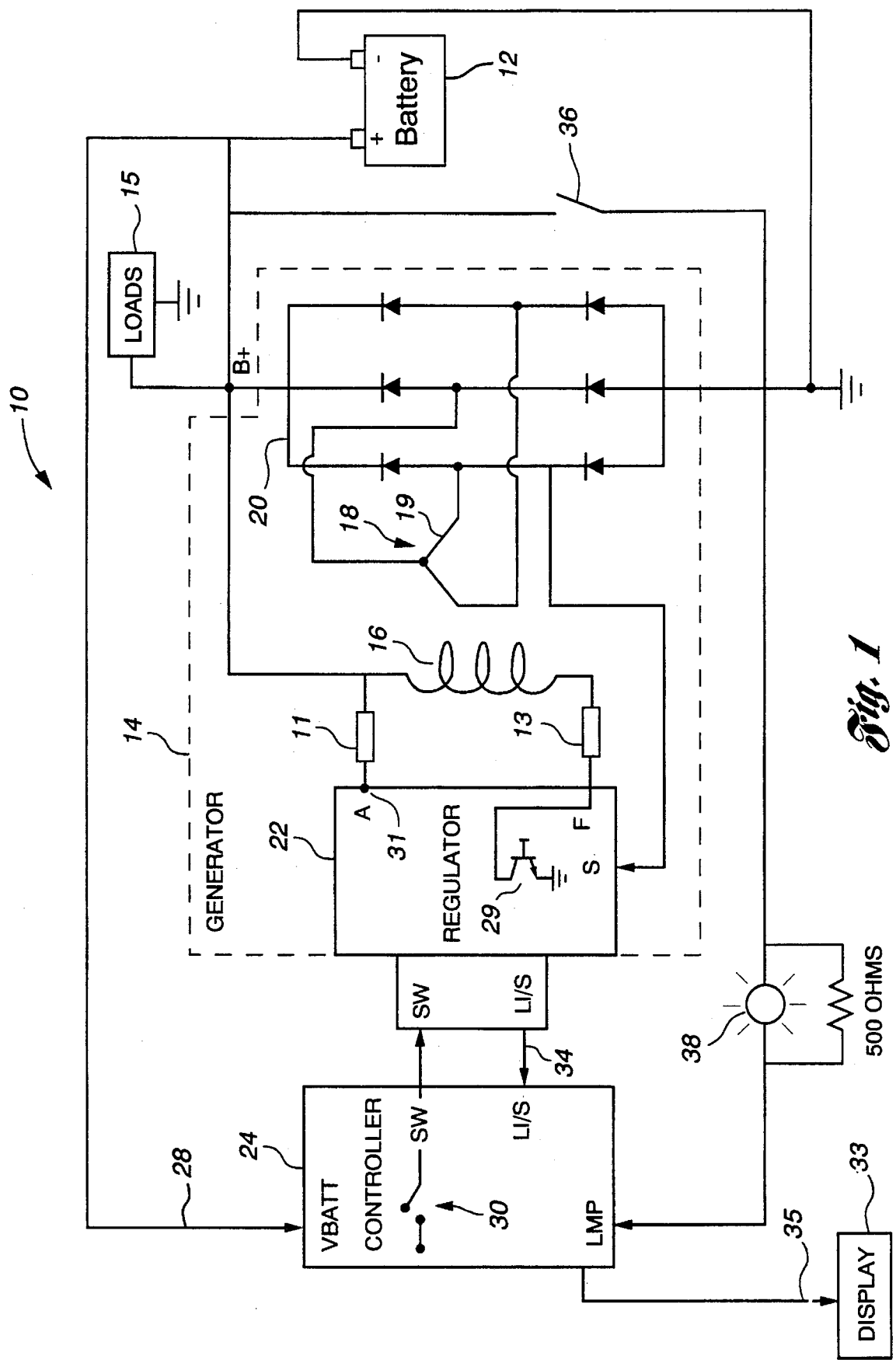
FIG. 1 is a schematic diagram of the system of the preferred embodiment of the present invention.

Turning now to FIG. 1, there is shown a schematic diagram of the system 10 of the present invention. The system 10 includes a conventional automotive battery 12. The system 10 of the present invention also includes a generator 14 for providing rectified alternating current for powering loads or electronic components 15 of an automotive vehicle and for storage in the battery 12. The generator 14 is of a conventional type for producing alternating current.

The generator 14 includes a rotor (not shown) which is comprised of a field coil 16 and a pair of brushes 11,13 coupled to the field coil 16. The generator 14 also includes a conventional stator 18 having a plurality of conductors 19 for generating sinusoidal alternating current. The plurality of conductors 19 may be connected in a "star connection", a "delta connection", or a "Y connection" with a center tap. Current through the field coil 16 induces a magnetic flux through the rotor. As the rotor turns, there is a variation in the flux which is proportional to the voltage induced in the stator 18.

Coupled to the stator 18 is a conventional full-wave bridge rectifier circuit 20. The bridge rectifier circuit 20 converts the alternating current induced in the stator 18 into a direct current since alternating current is not suitable for storing charge in the battery 12 or for supplying power to the electrical and electronic components of the vehicle.

The generator 14 also includes a voltage regulator 22. The voltage regulator 22 may be any conventional low side, single switching regulator. The voltage regulator 22 normally receives a direct current (DC) signal from the battery 12 via a battery voltage feedback signal 28 and controls the voltage by switching a ground side switch 29 accordingly. The regulator 22 protects the electronic components 15 against over-voltage and prevents the battery 12 from being overcharged under normal operating conditions.

The present invention, however, includes a microprocessor-based controller 24, such as a powertrain control module (PCM) coupled between the battery 12 and the regulator 22 of the generator 14. When an ignition switch 36 is switched on, current from the battery flows via a warning lamp 38 to the PCM 24. The PCM 24 commands a specific voltage to be applied at the battery 12. The regulator 22 responds by providing a path for current to flow from a positive side of the battery 12 through the field coil 16 to ground. The PCM 24 receives the voltage feedback signal 28 from the battery 12 and controls a high-side switch 30 connected to the regulator 22. The high-side switch 30 is connected to a power side 31 of the field coil 16. The high-side switch 30 is closed under normal operation so as to allow the entire voltage feedback signal 28 to pass directly to the field coil 16. In the event of a regulator failure or a field coil short circuit, however, the PCM 24 applies pulse width modulation (PWM) at a predetermined duty cycle to the high-side switch 30. The PWM duty cycle is selected to limit the battery voltage to a nominal operating voltage of the electronic components 15.

The PCM 24 receives a load indication/stator feedback signal 34 indicating the load on the generator 14. This signal compares the voltage of the field coil 16 to the voltage of the battery 12 and determines a system demand.

The system 10 of the present invention also includes a display 33 coupled to the PCM 24. In the event a regulator failure is detected, the PCM 24 generates a failure signal 35 for receipt by the display 33. The display 33 provides an indication to a user of the automotive vehicle that service is required.

Figure 2:
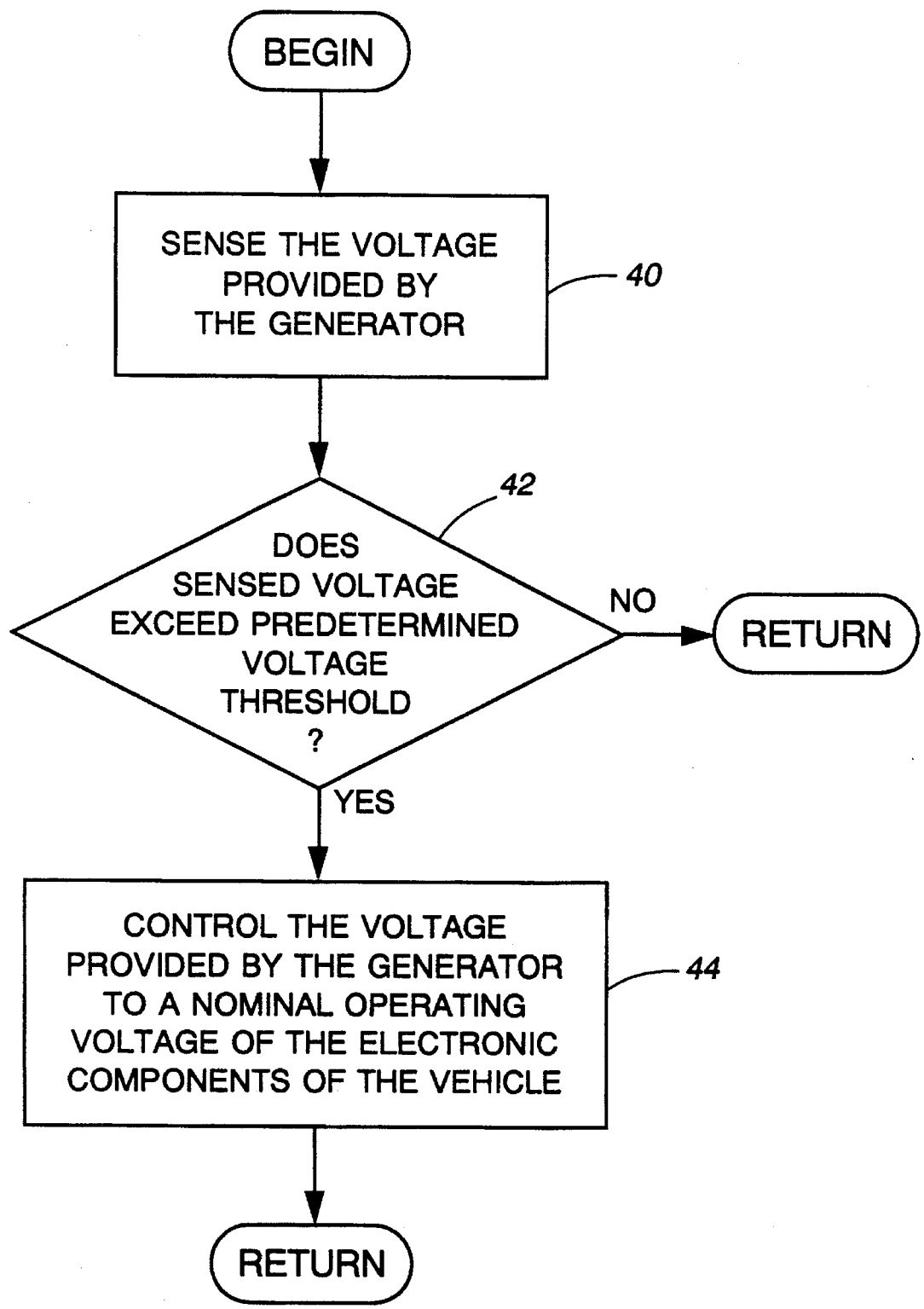
FIG. 2 is a flow diagram illustrating the general sequence of steps associated with the method of the present invention.

Referring now to FIG. 2, the method of the present invention will now be described. The method begins with the initial step of sensing the voltage provided by the generator, as indicated by block 40. Next, the sensed voltage is compared to a predetermined voltage threshold, as indicated by conditional block 42. If the sensed voltage does not exceed the predetermined voltage threshold, the regulator 22 is operating properly. However, if the sensed voltage exceeds the predetermined voltage threshold, a regulator failure is detected.

Upon detecting a regulator failure, the method continues with the step of controlling the voltage provided by the generator to a nominal operating voltage of the electronic components of the vehicle, as shown by block 44. The DC signal provided to the high-side switch 30 of the field coil 16 is cycled at a predetermined duty cycle to prevent damage to the battery and to provide the pre-determined regulated voltage level.

The benefits of the method and system of the present invention are numerous. First, overcharging of the battery is prevented. Second, the maximum operating voltage of the electronic components of the vehicle can be reduced. The reduced maximum operating voltage further results in reduced cost, size and weight of heat sinks associated with the electronic components. Finally, the battery charging system will safely operate in a degraded condition so that immediate service is not absolutely necessary.

While the best mode for carrying out the invention have been described in detail, those familiar with the art to which this invention relates will recognize various alternative designs and embodiments for practicing the invention as defined by the following claims.

What is claimed is:

1. For use with a power supply system of an automotive vehicle including a battery, a generator, and a regulator, the generator for providing a nominal voltage for electronic components of the vehicle, and the regulator for controlling the voltage provided by the generator a method for limiting the voltage provided by the generator in the event of a failure of the regulator, the method comprising:

sensing the voltage provided by the generator and generating a corresponding voltage signal;

determining whether the voltage signal exceeds a predetermined voltage threshold; and if the voltage signal exceeds the predetermined voltage threshold, generating an alternative nominal voltage provided by the generator so as to protect the electronic components of the vehicle from over-voltage damage.

2. The method as recited in claim 1 further comprising a normally closed switch coupled to the regulator and wherein the step of generating the alternative nominal voltage includes the step of cycling the switch at a predetermined duty cycle.

3. The method as recited in claim 1 further comprising:

generating a failure signal if the voltage signal exceeds the predetermined voltage threshold; and displaying the failure signal to a user of the vehicle.

4. For use with a power supply system of an automotive vehicle including a battery, a generator, and a regulator, the generator for providing a nominal voltage for electronic components of the vehicle, and the regulator for controlling the voltage provided by the generator, a system for limiting the voltage provided by the generator in the event of a failure of the regulator, the system comprising:

a sensing circuit for sensing the voltage provided by the generator and generating a corresponding voltage signal;

means for determining whether the voltage signal exceeds a predetermined voltage threshold; and means for generating an alternative nominal voltage provided by the generator so as to protect the electronic components of the vehicle from over-voltage damage.

5. The system as recited in claim 4 wherein the means for generating the alternative nominal voltage comprises a normally closed switch coupled to the regulator.

6. The system as recited in claim 4 further comprising:

means for generating a failure signal; and a display for displaying the failure signal to a user of the vehicle.

7. The system as recited in claim 4 wherein the sensing circuit is a voltage sensor.

* * * * *